(12) United States Patent
Lai et al.

(10) Patent No.: US 11,422,438 B2
(45) Date of Patent: Aug. 23, 2022

(54) THREE-DIMENSIONAL HUMAN BODY SCANNING DEVICE

(71) Applicants: SUMMER SMILE INTERNATIONAL CO., Taichung (TW); INDUSTRIAL TECHNOLOGY RESEARCH INSTITUTE, Hsinchu (TW)

(72) Inventors: Ting-Hao Lai, Hsinchu (TW); Hsiang-Chun Lin, Taichung (TW)

(73) Assignees: SUMMER SMILE INTERNATIONAL CO., Taichung (TW); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 91 days.

(21) Appl. No.: 16/864,988

(22) Filed: May 1, 2020

(65) Prior Publication Data

US 2020/0363705 A1 Nov. 19, 2020

Related U.S. Application Data

(60) Provisional application No. 62/841,857, filed on May 2, 2019.

(51) Int. Cl.
| | |
|---|---|
| *G03B 17/56* | (2021.01) |
| *G01G 19/50* | (2006.01) |
| *A41H 1/02* | (2006.01) |
| *H04N 5/225* | (2006.01) |
| *H04N 5/232* | (2006.01) |
| *G01B 21/16* | (2006.01) |

(52) U.S. Cl.
CPC ............. *G03B 17/561* (2013.01); *A41H 1/02* (2013.01); *G01B 21/16* (2013.01); *G01G 19/50* (2013.01); *H04N 5/2253* (2013.01); *H04N 5/23299* (2018.08)

(58) Field of Classification Search
CPC ...... G03B 17/561; G03B 37/02; G01G 19/50; A41H 1/02; H04N 5/2253; H04N 5/23299; H04N 5/2251; G01B 21/16; F16M 11/2014; F16M 11/28; F16M 11/18; F16M 11/041; F16M 11/42
See application file for complete search history.

(56) References Cited

U.S. PATENT DOCUMENTS

2011/0085637 A1* 4/2011 Boese .................... A61B 6/027
378/4
2017/0353711 A1* 12/2017 Wayenberg .......... H04N 13/221

* cited by examiner

*Primary Examiner* — Yogesh K Aggarwal
(74) *Attorney, Agent, or Firm* — Muncy, Geissler, Olds & Lowe, P.C.

(57) ABSTRACT

A three-dimensional human body scanning device includes: a carrier module, moving around a to-be-measured person; a bracket module, installed above the carrier module, where the bracket module includes a plurality of stretchable brackets connected in an enveloping and storage manner, and other brackets are accommodated and assembled inside a sleeve; and a fixed module, installed on the sleeve, where the fixed module is used to hold the scanning device, and drives the scanning device through up-and-down stretch of the bracket module and movement of a slider element to scan a human body.

11 Claims, 14 Drawing Sheets

THREE-DIMENSIONAL HUMAN BODY SCANNING DEVICE

CROSS REFERENCE TO RELATED APPLICATIONS

This application claims priority of U.S. Provisional Application No. 62/841,857 filed on May 2, 2019 under 35 U.S.C. § 119(e), the entire contents of all of which are hereby incorporated by reference.

BACKGROUND

Technical Field

The present disclosure relates to a three-dimensional human body scanning device.

Related Art

In general, during purchasing of clothes, a seller generally divides sizes of clothes into only several different sizes such as S, M, L, XL, and the like. However, because people have different body shapes, when a three-dimensional size of a body is exactly between two sizes, people often feel that clothes of a smaller size (in particular, relatively close-fitting clothes) are too small, and clothes of a larger size are too big to fit the body. In particular, during purchasing of close-fitting underwear or body-shaping underwear, a high requirement is imposed on fitness for each part of the body. Therefore, several different sizes made by a tailoring manufacturer according to statistical data cannot meet the requirements of all customers at all. The customers often buy ill-fitting clothes and feel uncomfortable, and an overall visual appearance is imperfect.

Therefore, a trend of tailoring clothes according to stature of a consumer emerges on the market. However, a traditional practice of tailoring and sewing by service personnel after measuring the size of a consumer's body has problems of low production efficiency and high labor costs. Even due to insufficient experience of measurement personnel or personal problems of a to-be-measured person, actual measurement sizes will have problems such as an error and a poor stereoscopic data effect.

With scientific and technological advances, there are many devices through electronic measurement. However, current known human body scanning devices need a rotating mechanism, a ring assembly, a bracket assembly, and the like. Due to a large variety of components, complexity of a structure, and a large size of an entire mechanism, not only assembling is laborious, accordingly increasing manufacturing costs and selling prices, but also the device is inconvenient to carry as a whole, and is required to be assembled and operated by professional personnel.

SUMMARY

The present disclosure discloses a three-dimensional human body scanning device, the three-dimensional human body scanning device including at least a carrier module, a bracket module, a sleeve, a fixed module, and a scanning device in implementation. The carrier module includes a power source inside, the carrier module moving around a to-be-measured person. The bracket module is installed above the carrier module, the bracket module including a plurality of stretchable brackets connected in a storage manner, the sleeve being installed at an uppermost part of the bracket module and receiving the bracket inside the sleeve. The fixed module is assembled outside the sleeve, the fixed module being configured to fix the scanning device, and the fixed module moving up and down in a slide rail of the sleeve using a slider element and driving the scanning device through up-and-down stretch of the bracket module and movement of the slider element to scan a human body.

This application is characterized in that when a user uses the three-dimensional human body scanning device to scan a human body, the to-be-measured person may implement human body scanning without rotating. The carrier module moves around the to-be-measured person, a bracket of the bracket module moves in a stretchable and storage manner, and the fixed module moves on the sleeve, so that the scanning device on the fixed module may perform 360° scanning on the to-be-measured person at different heights in sections to obtain dimensions of each part at different heights of the body of the to-be-measured person. Further, the fixed module may perform an action at an inclination angle to increase a range of scanning angles of the scanning device.

DETAILED DESCRIPTION

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that in the specification, claims, and accompanying drawings of the present disclosure, the terms "first", "second", "third", "fourth", and so on are intended to distinguish between similar objects but do not necessarily indicate a specific order or sequence. It should be understood that the used terms in such a way are interchangeable in proper circumstances, so that the embodiments of the present disclosure described herein could be implemented in orders except the order illustrated or described herein. In addition, the terms "include", "have", and any variants thereof are intended to cover non-exclusive inclusion. For example, a process, method, system, product, or device that includes a series of steps or units is not necessarily limited to those steps or units specified expressly, but may include other steps or units not specified expressly or inherent to such a process, method, system, product, or device.

Figure 1:
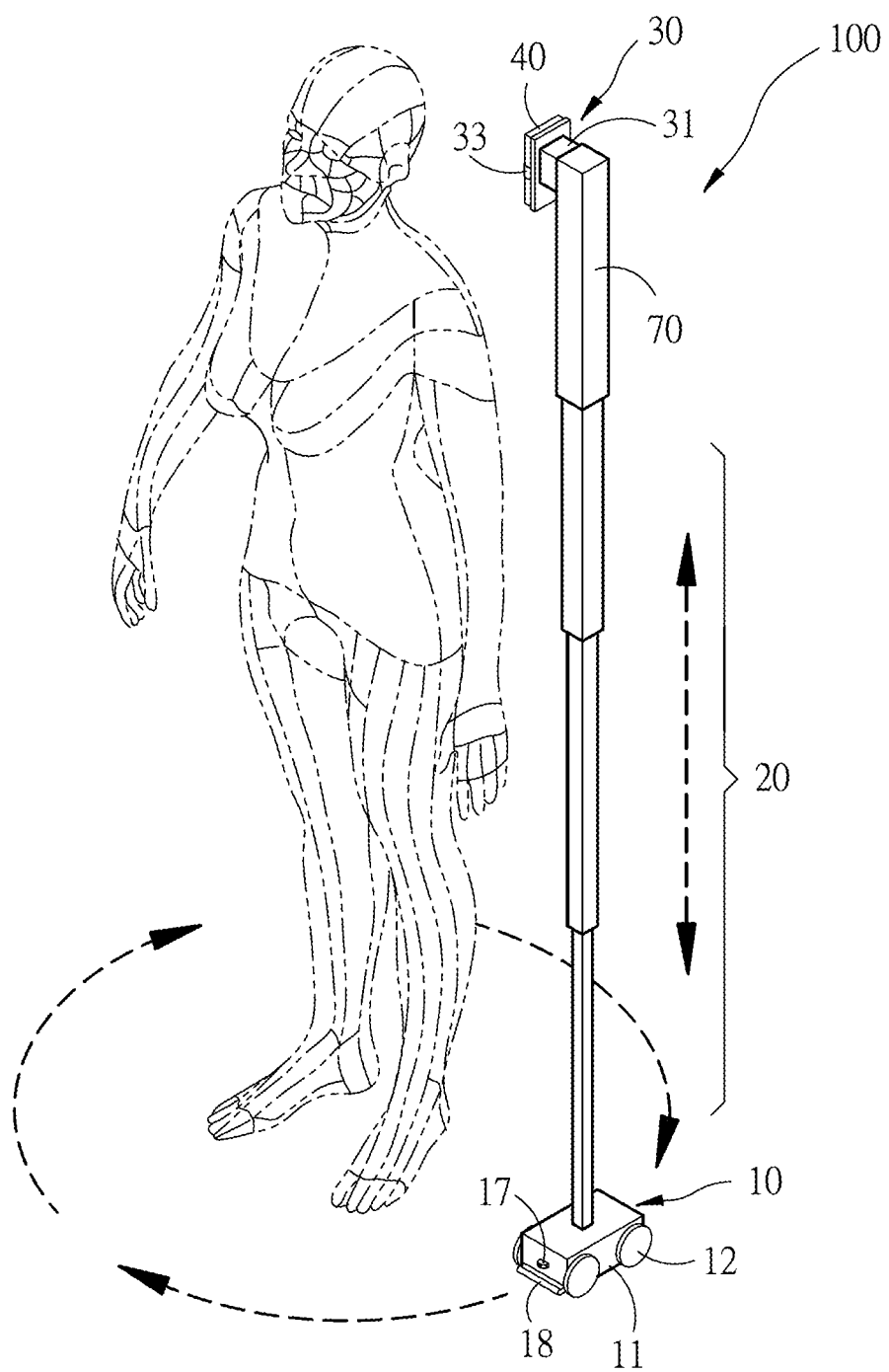
FIG. 1 is a schematic diagram of actions of a three-dimensional human body scanning device according to a first embodiment of the present disclosure.
Figure 2:
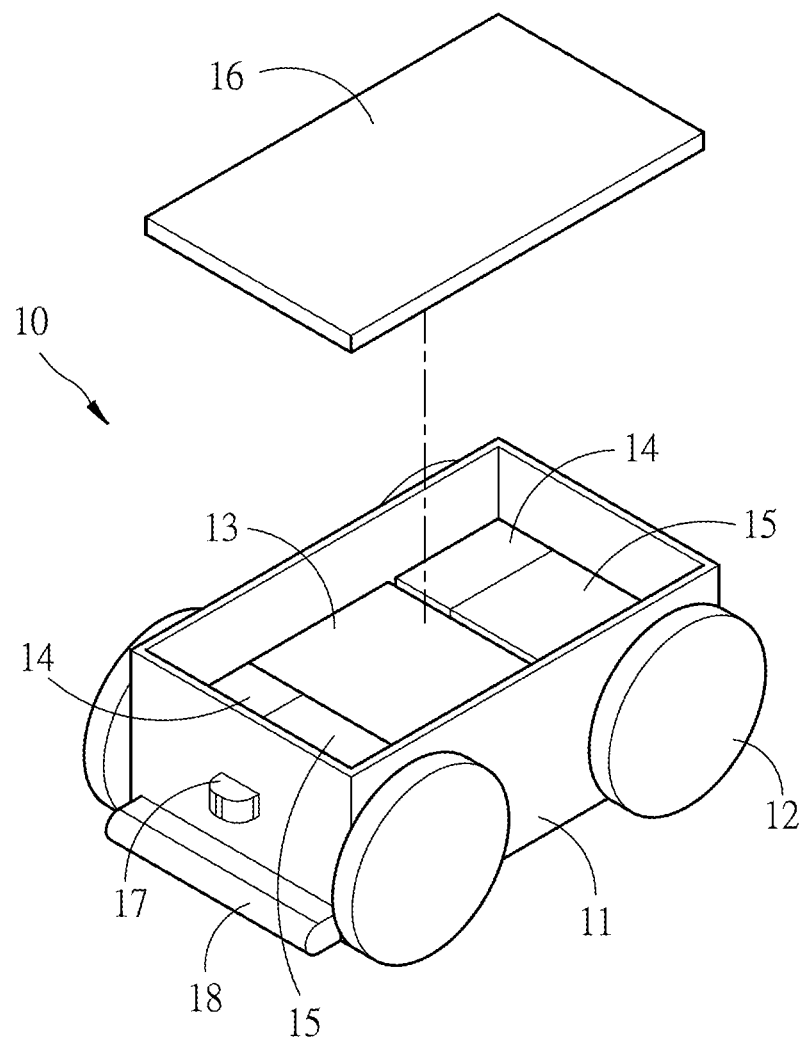
FIG. 2 is a schematic exploded view of a carrier module according to an embodiment of the present disclosure.

Referring to FIG. 1 and FIG. 2, FIG. 1 is a schematic diagram of actions of a three-dimensional human body scanning device according to a first embodiment of the present disclosure, and FIG. 2 is a schematic exploded view of a carrier module according to an embodiment of the present disclosure. The present disclosure discloses a three-dimensional human body scanning device 100, the three-dimensional human body scanning device 100 including a carrier module 10, a bracket module 20, a sleeve 70, a fixed module 30, and a scanning device 40 in implementation. In use, the carrier module 10 moves around a to-be-measured person, and a bracket of the bracket module 20 moves in a stretchable and storage manner and drives the fixed module 30 to move up and down, so that the scanning device 40 on the fixed module 30 may perform 360° scanning on the to-be-measured person at different heights in sections to obtain dimensions of each part of the body of the to-be-measured person.

In this embodiment, the carrier module 10 is a car body 11 automatically moving and with an accommodation space inside, a plurality of wheels 12 is pivotally connected to a left side and a right side outside the car body 11 respectively, and a first control circuit board 16, a battery 13 (in an embodiment, the battery 13 may be a secondary battery), at least one driver 14, and at least one sensor 17 (18) electrically connected to the first control circuit board 16, and at least one first motor device 15 controlled by the driver 14 are installed in the car body 11, the first motor device 15 being used as a power source inside the carrier module 10.

In implementation, the driver 14 drives the wheels 12 to rotate, the driver 14 is supplied with power through the battery 13 and is electronically connected to the first control circuit board 16, thereby driving the wheels 12 on the car body 11 to rotate to drive the car body 11 to move, so that the carrier module 10 could move around the to-be-measured person.

In implementation application, the carrier module 10 varies according to a user requirement, and a spring may be added to the wheels 12 or not used according to a user requirement, to increase or decrease a suspension function. Alternatively, a wheel type is replaced with the following two types: a general-type wheel for indoor use on a general flat ground, a wheel surface material being changed according to a user site requirement into: a PU wheel surface being a general wheel surface and being replaced quickly and cheaper; a rubber wheel surface with a relatively high carrying capacity; or a silicone wheel surface less prone to ageing with a relatively long service life; and a crawler-type wheel for use on a relatively rugged and bumpy ground.

In implementation, a contactless anti-collision sensor 17 and a contact anti-collision sensor 18 are disposed in front of or both in front of or behind the car body 11. The sensor 17 is configured to send a signal to stop movement of the carrier module 10 when it is detected that an obstacle exists on a forward path of the car body 11. The sensor 18 is configured to send a signal to stop movement of the carrier module 10 when the car body 11 collides with the obstacle on the forward path. In implementation, the sensors 17 and 18 both have a transmission end and a receiving end, the transmission end sending a signal, for example, reflecting a signal to the receiving end when an obstacle is detected, and the receiving end stopping the movement of the carrier module after receiving the signal.

In implementation, the bracket module 20 is installed and fixed above the carrier module 10. According to the known technology, the bracket module 20 may be fixed to the carrier module 10 through screwing, clamping using a spring, using balls, through a structure, using tenons, and through gas oil pressure.

Figure 12:
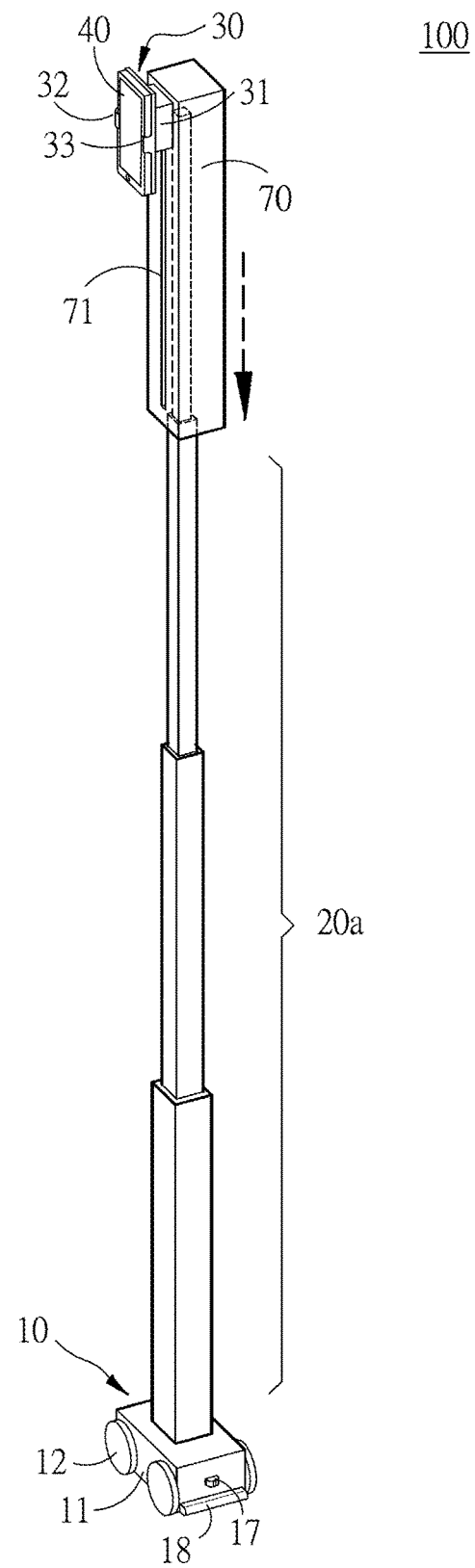
FIG. 12 is a schematic diagram of a bracket module according to another embodiment of the present disclosure.

In implementation, the bracket module 20 includes a plurality of stretchable brackets connected in a storage manner. The sleeve 70 is installed at an uppermost part of the bracket module 20 and may receive and assemble other brackets inside the sleeve. The bracket module 20 includes brackets with pipe diameters of different sizes, the plurality of brackets are sequentially sleeved and folded according to a pipe diameter size, and one end of a bracket with a smallest pipe diameter in the plurality of brackets is connected to and erected on a top surface (as shown in FIG. 1) of the car body 11. Alternatively, in the plurality of brackets of the bracket module 20a, one end of a bracket with a largest pipe diameter is connected to and erected on a top surface (as shown in FIG. 12) of the car body 11.

In practice, the uppermost sleeve 70 is used to accommodate the bracket module 20 through a storage method. The bracket module 20 connects a plurality of brackets using a telescopic method, to repeatedly move in a stretchable manner through stretching and storage of other brackets. In application, there may also be less than three or more brackets.

Figure 3:
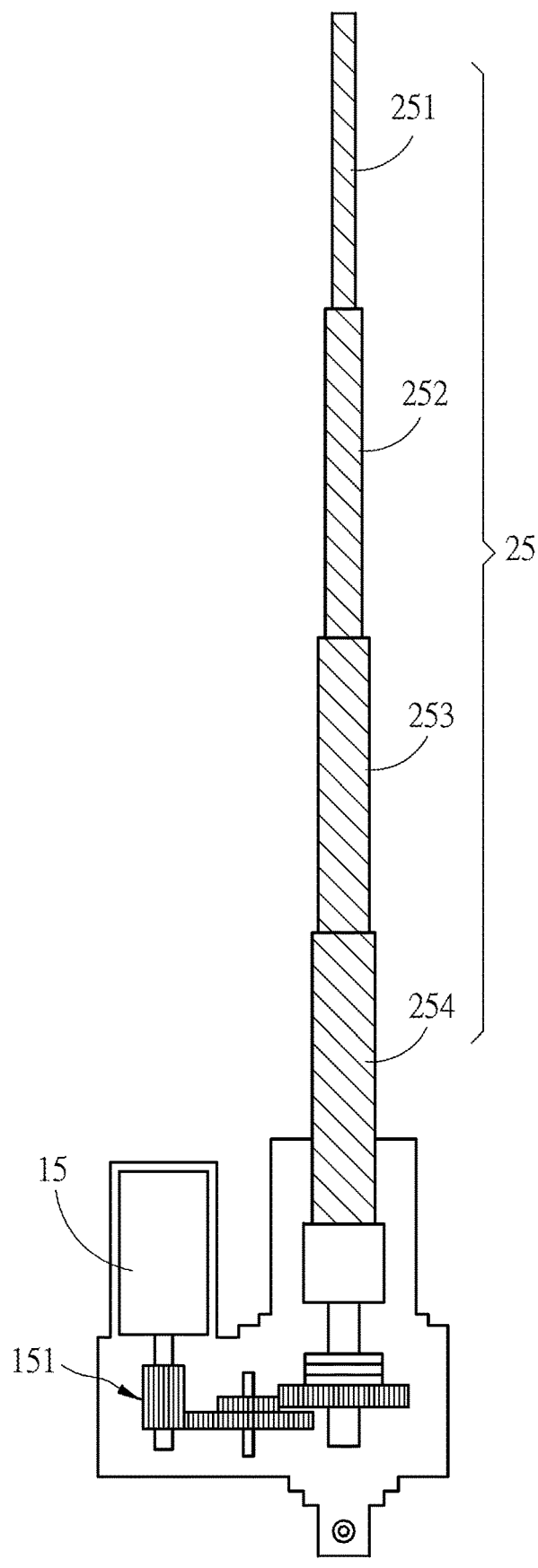
FIG. 3 is a schematic diagram of a set of stretchable rods of a bracket module according to an embodiment of the present disclosure.

In this embodiment, the bracket module 20 further includes a set of stretchable rods 25 inside the bracket, the set of stretchable rods 25 driving the foregoing bracket to move in a stretchable manner. FIG. 3 is a schematic diagram of a set of stretchable rods of a bracket module according to an embodiment of the present disclosure. Three brackets and one sleeve are used as an example for description. In implementation, a set of stretchable rods 25 may include a first-section screw rod 251, a second-section screw rod 252, a third-section screw rod 253, and a fourth-section screw rod 254 from top to bottom. The set of stretchable rods 25 is driven by a power source inside the carrier module 10, so that the first-section screw rod 251 may be accommodated inside the second-section screw rod 252, the second-section screw rod 252 may be accommodated inside the third-section screw rod 253, and the third-section screw rod 253 may be accommodated inside the fourth-section screw rod 254.

Figure 4:
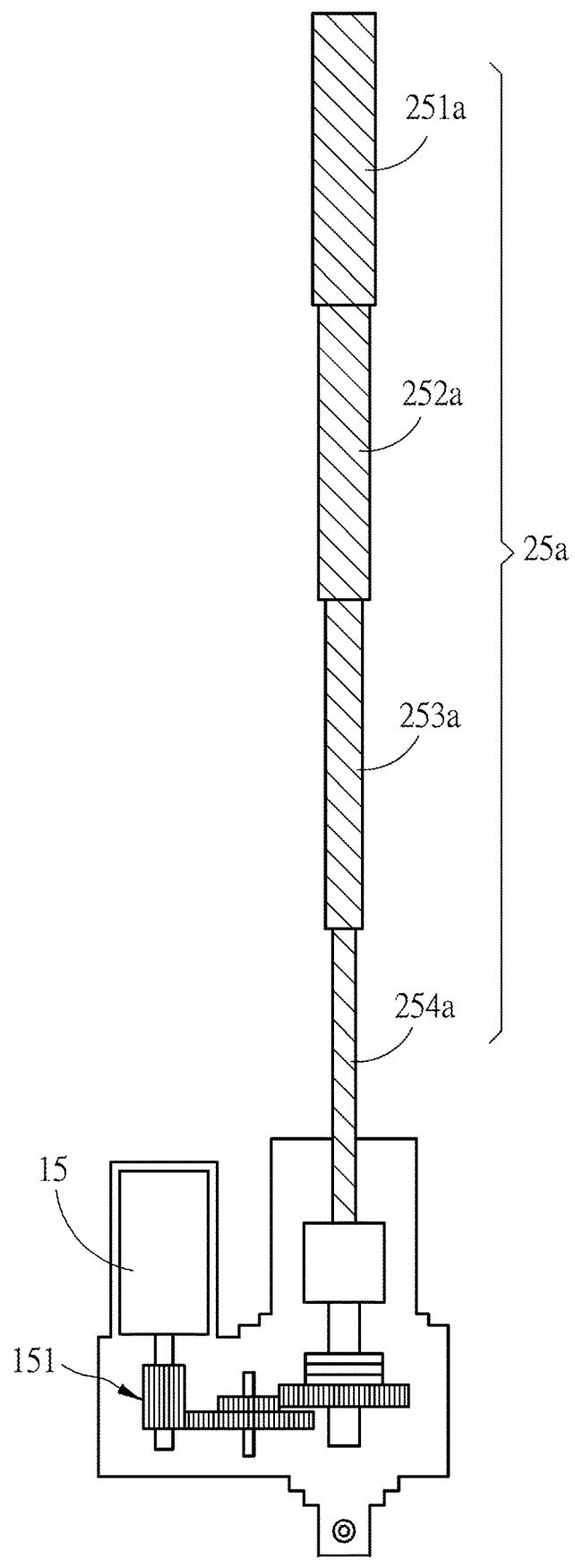
FIG. 4 is a schematic diagram of a set of stretchable rods of a bracket module according to another embodiment of the present disclosure.
Figure 5A:
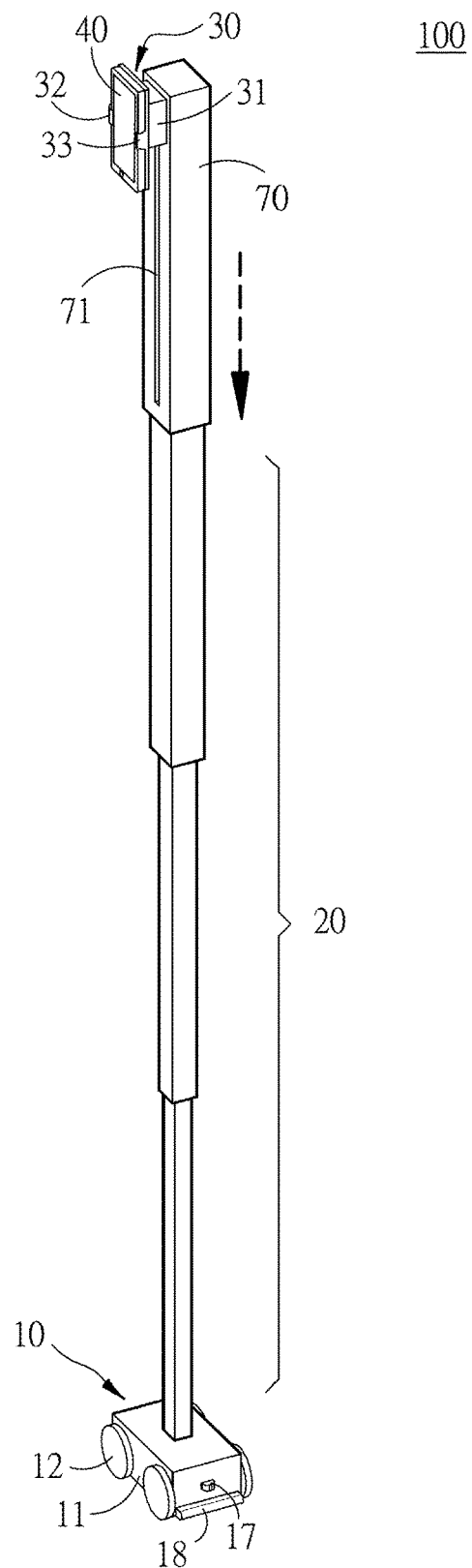
FIG. 5A to FIG. 5E are schematic diagrams of actions of a bracket module according to an embodiment of the present disclosure.
Figure 5B:
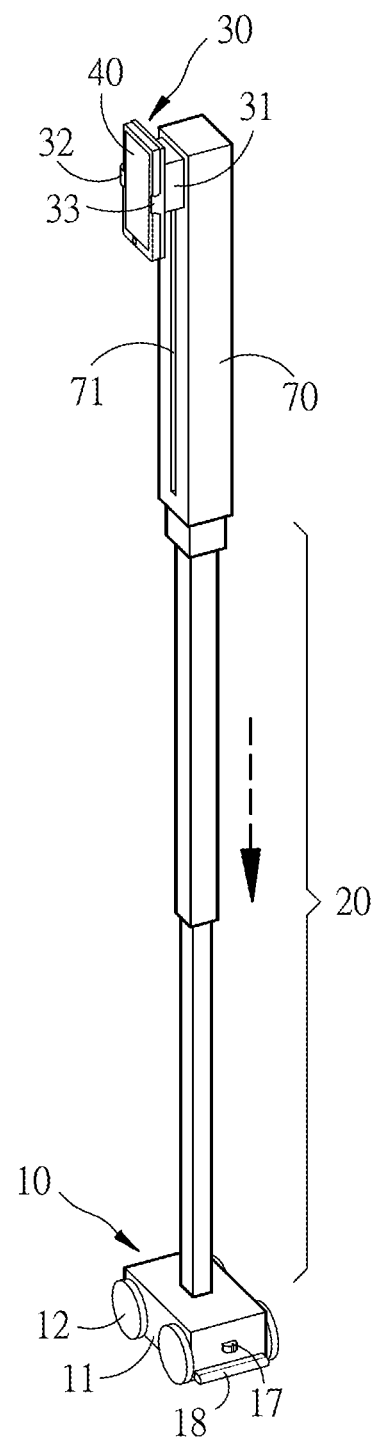
Figure 5C:
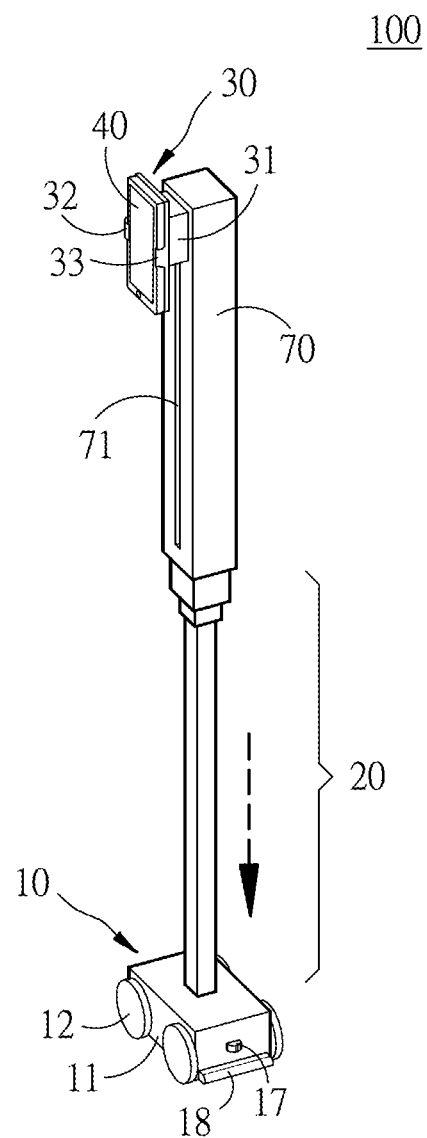
Figure 5D:
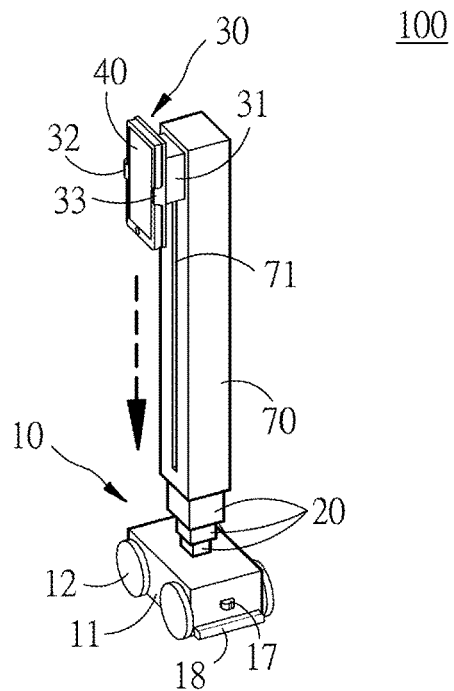
Figure 5E:
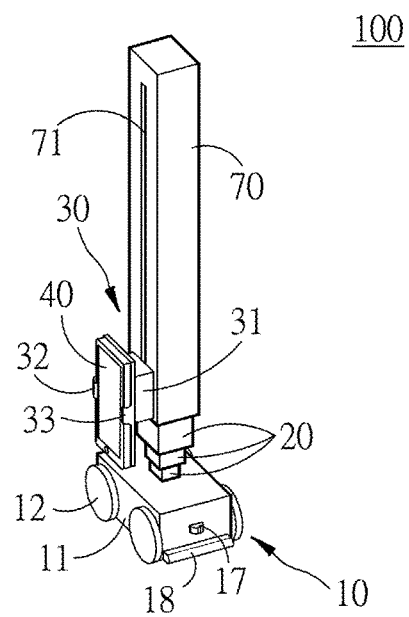

FIG. 4 is a schematic diagram of a set of stretchable rods of a bracket module according to another embodiment of the present disclosure. Alternatively, in implementation, a set of stretchable rods 25a may include a first-section screw rod 251a, a second-section screw rod 252a, a third-section screw rod 253a, and a fourth-section screw rod 254a from top to bottom. The set of stretchable rods 25a is driven by a power source in the carrier module 10, so that the fourth-section screw rod 254a may be accommodated inside the third-section screw rod 253a, the third-section screw rod 253a may be accommodated inside the second-section screw rod 252a, and the second-section screw rod 252a may be accommodated-inside the first-section screw rod 251a.

In implementation application, when the set of stretchable rods 25 (the set of stretchable rods in FIG. 3 is used as an example for description) may be enabled by the foregoing first motor device 15 and driven through deceleration of a reduction gear set 151 to rotate forward (for example, rotate clockwise), the third-section screw rod 253 first stretches out from the fourth-section screw rod 254, the second-section screw rod 252 stretches out from the third-section screw rod 253, and then the first-section screw rod 251 stretches out from the second-section screw rod 252. Through driving of the screw rod, a bracket of the bracket module 20 stretches to form a straight line erected on one side of the to-be-measured person.

Further referring to FIG. 5A to FIG. 5E, FIG. 5A to FIG. 5E are schematic diagrams of actions of a bracket module according to an embodiment of the present disclosure. The bracket shown in FIG. 1 is used as an example for description. When a first motor device 15 is started and drives the set of stretchable rods 25 through deceleration of a reduction gear set 151 to rotate backward (for example, rotate counterclockwise), a first-section screw rod 251 is accommodated inside a second-section screw rod 252, the second-section screw rod 252 is accommodated inside a third-section screw rod 253, the third-section screw rod 253 is accommodated inside a fourth-section screw rod 254. In this way, the sleeve 70 is driven to move downward to sequentially accommodate the bracket of the bracket module 20 below inside the sleeve.

Figure 6:
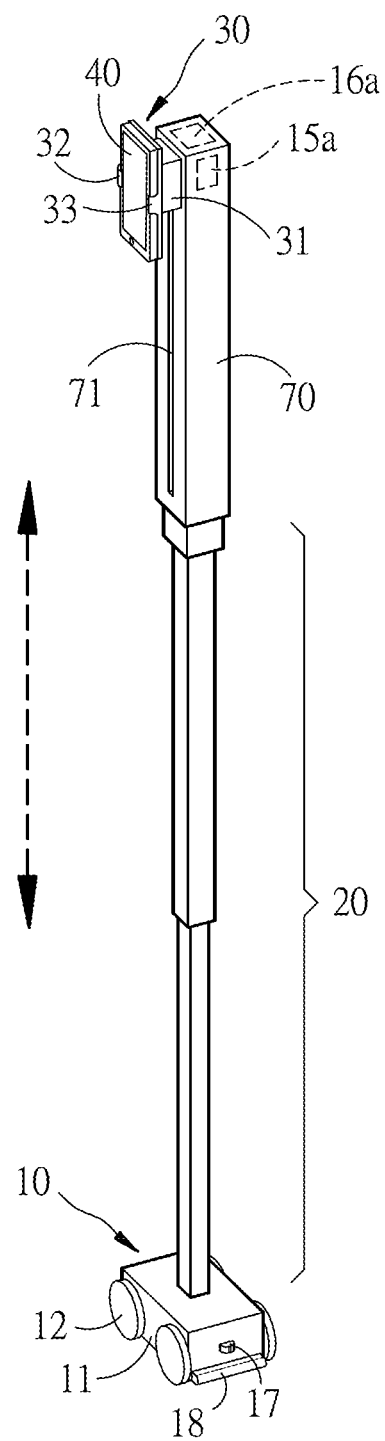
FIG. 6 is a schematic diagram of actions of a bracket module according to another embodiment of the present disclosure.

FIG. 6 is a schematic diagram of actions of a bracket module according to another embodiment of the present disclosure. In implementation, a second motor device 15a and a second control circuit board 16a may alternatively be installed inside the sleeve 70, and the second control circuit board 16a inside the sleeve 70 controls the second motor device 15a to drive actions of a set of stretchable rods 25, thereby controlling a height of the bracket module 20.

Further, a slide rail 71 in a same direction as a length of the sleeve 70. A fixed module 30 is installed on the sleeve 70 for fixing a scanning device 40. In implementation application, the scanning device 40 may be a device such as a smartphone, a tablet computer, or a portable arithmetic unit currently used for three-dimensional scanning. For example, a current smartphone already has good related camera hardware and good software carrying capability. In application, not only the smartphone may be used for scanning, but also the scanning device 40 may be used to control the carrier module 10. In addition, data after the scanning may be not only wirelessly transmitted to a remote host (not shown), and the scanning device 40 may also be used to directly display scanning information through operation using internal software.

In implementation, the fixed module 30 may repeatedly move up and down in the slide rail 71 of the sleeve 70 using a slider element 31. In further application, the fixed module 30 may perform an action at an inclination angle, thereby increasing a range of scanning angles of the scanning device 40.

Further, at least one of a clamping device and an adsorption device may be disposed on the slider element 31 to fix the scanning device 40 onto the slider element 31 in a manner such as left and right clamping, up and down clamping, or adsorption (including magnetic adsorption). The left and right clamping is used as an example for description in the drawing of this embodiment. For example, the scanning device 40 is a smartphone. A first clamping portion 32 and a second clamping portion 33 are oppositely disposed on left and right sides of the slider element 31, the first clamping portion 32 and the second clamping portion 33 fixing the scanning device 40 onto the slider element 31 through clamping on the left and right sides.

Figure 7:
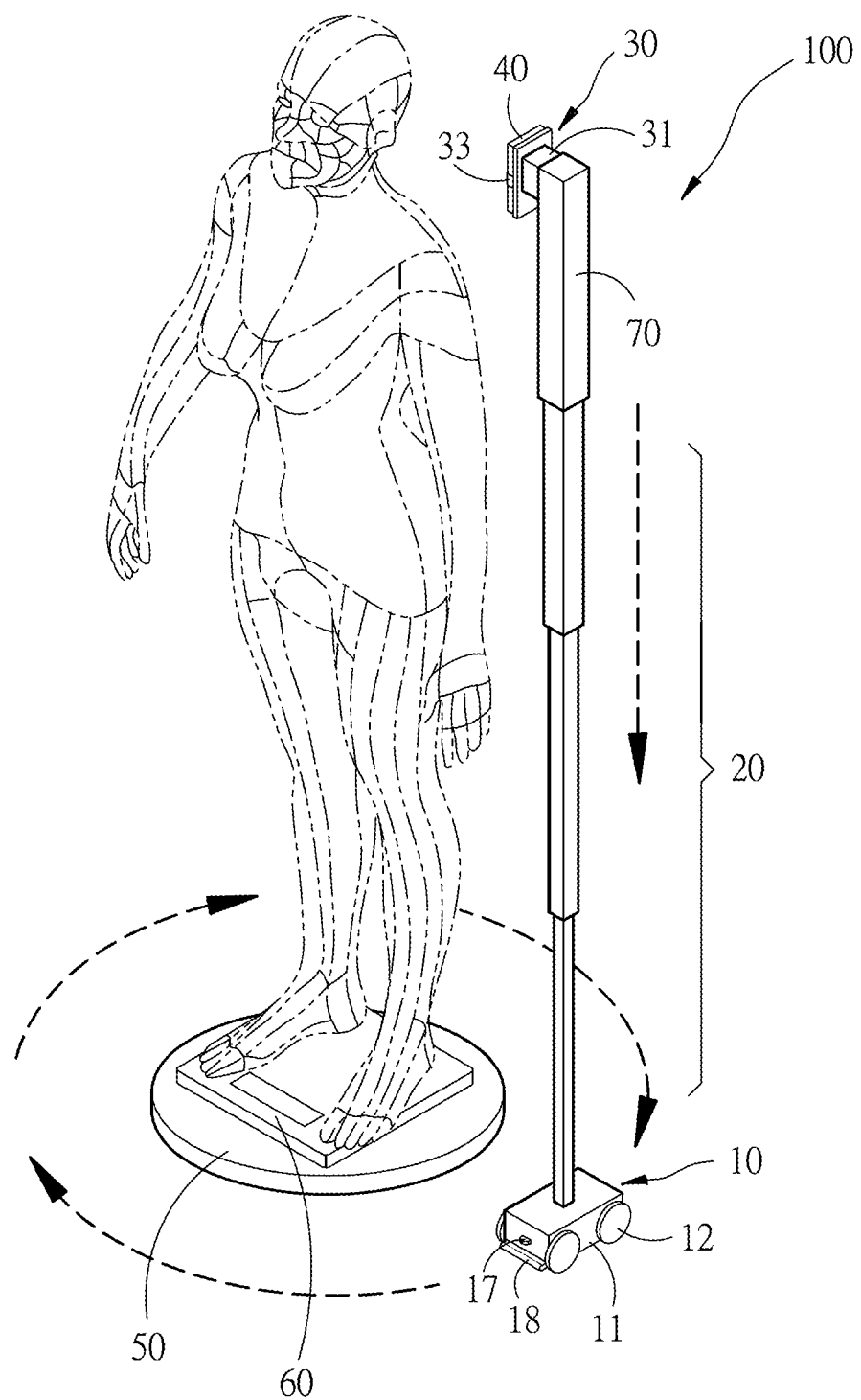
FIG. 7 is a schematic diagram of actions of a three-dimensional human body scanning device according to a second embodiment of the present disclosure.

FIG. 7 is a schematic diagram of actions of a three-dimensional human body scanning device according to a second embodiment of the present disclosure. The second embodiment is the same as the first embodiment in application. A difference lies in that a positioning base 50 is included in the second embodiment, and in application, a to-be-measured person may stand on an upper surface of the positioning base 50, so that the carrier module 10 mates with the positioning base 50 to move around. The positioning base 50 is circular for the to-be-measured person to stand on. A measurer 60 may further be disposed above the positioning base 50. The measurer 60 may be a weighing scale or a body fat scale configured to obtain information about a body weight and body fat of the to-be-measured person. In an embodiment, data obtained through measuring by the measurer 60 is wirelessly transmitted to a scanning device 40.

Figure 8:
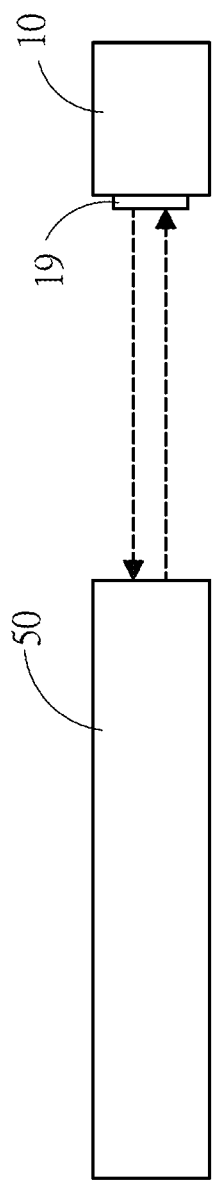
FIG. 8 is a schematic diagram of implementation of a distance sensor according to the present disclosure.
Figure 9:
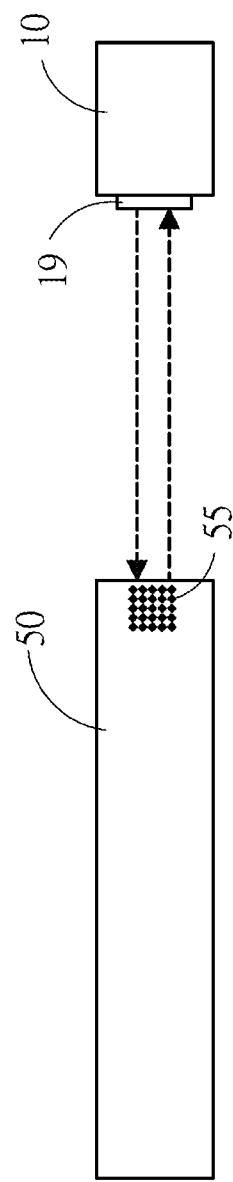
FIG. 9 is another schematic diagram of implementation of a distance sensor according to the present disclosure.

FIG. 8 is a schematic diagram of implementation of a distance sensor according to the present disclosure, and FIG. 9 is another schematic diagram of implementation of a distance sensor according to the present disclosure. In implementation and application, the carrier module 10 may use a distance measuring manner such as an infrared ray, an ultrasonic wave, an image, radar or a laser via a distance sensor 19 installed on a side edge. The distance sensor 19 has a transmission end and a receiving end, the transmission end sending a signal and the receiving end detecting a signal reflected from a positioning base 50 to obtain a distance (as shown in FIG. 8) through measurement. Alternatively, through a feature point 55 (for example, a feature color and a light-sensitive member) fixed on a side surface of the positioning base 50, the distance sensor 19 is used to detect a signal reflected to the receiving end to obtain a distance (as shown in FIG. 9) through measurement. Through a difference in speeds between an inner wheel and an outer wheel, or a manner of mating a driving wheel with a driven wheel, or mating between auxiliary guide steering wheels, a distance between the carrier module 10 and the positioning base 50 is obtained through measurement, so that the carrier module 10 moves around at a specific distance and moves more accurately around a to-be-measured person within a set radius.

Figure 10:
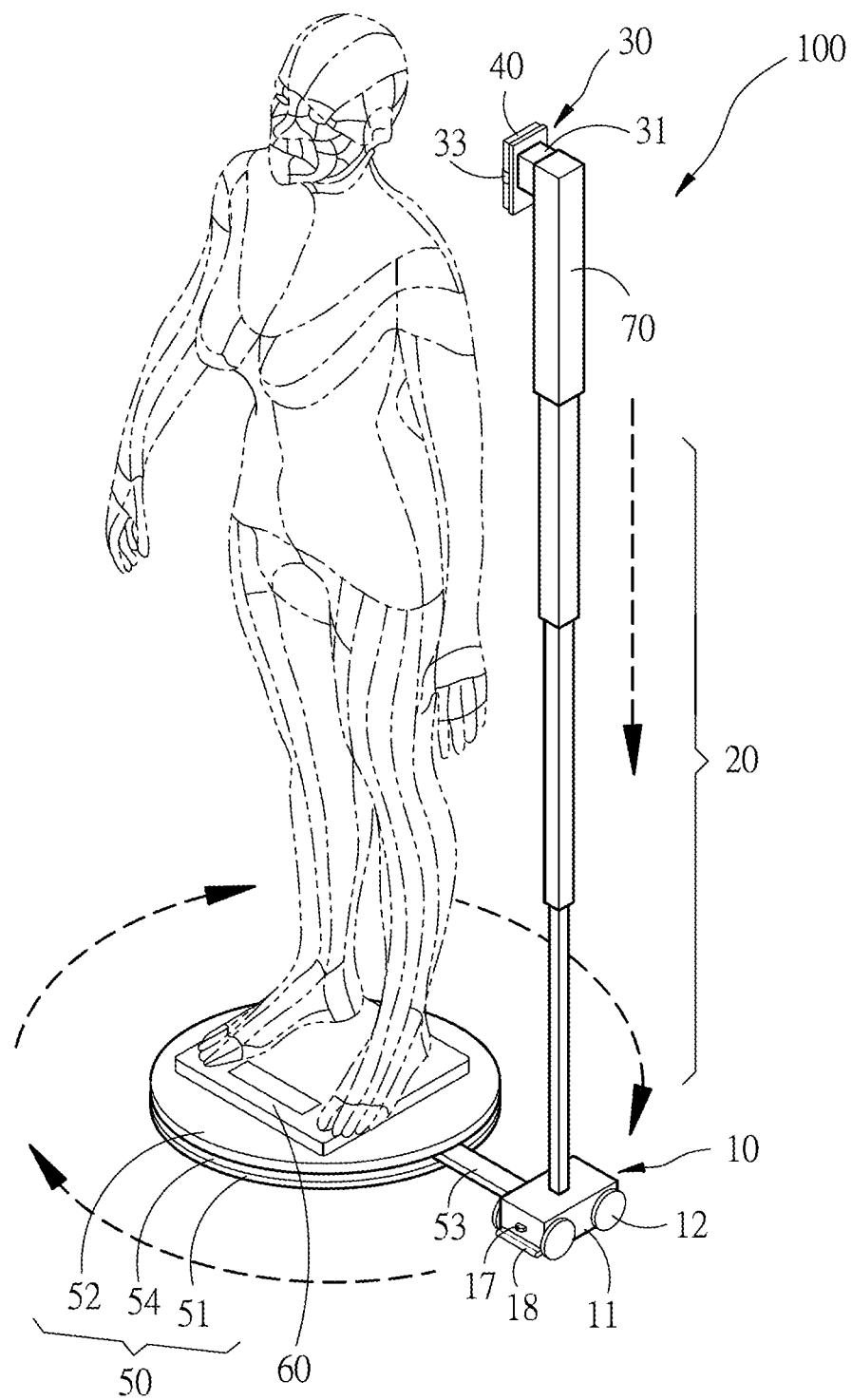
FIG. 10 is a schematic diagram of actions of a three-dimensional human body scanning device according to a third embodiment of the present disclosure.
Figure 11:
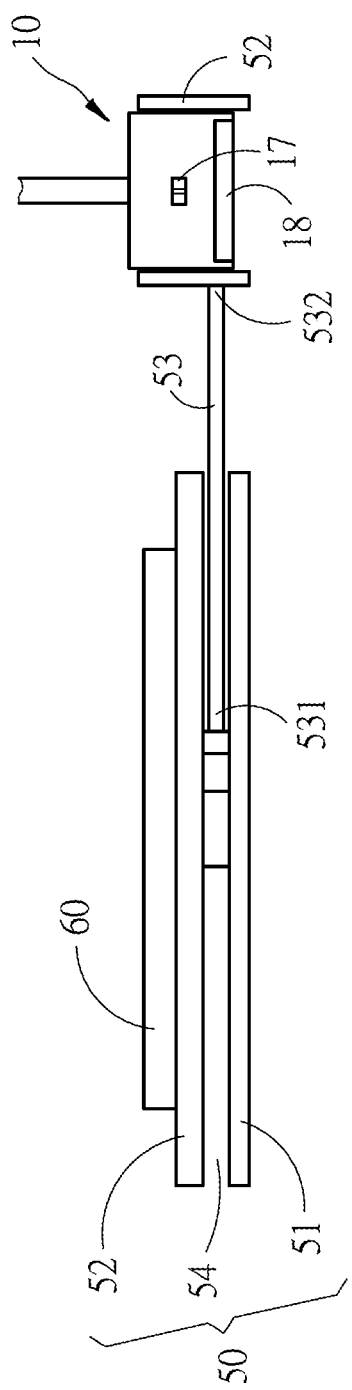
FIG. 11 is a schematic diagram of a chassis and a carrier module according to an embodiment of the present disclosure.

In implementation and application, in the present disclosure, when a sensor is not used, the body fat scale may also be used with a disc and a cantilever, so that a mobile carrier may rotate around a human body with different diameters depending on different postures of the to-be-measured person and perform scanning. Further referring to FIG. 10 and FIG. 11, FIG. 10 is a schematic diagram of actions of a three-dimensional human body scanning device according to a third embodiment of the present disclosure, and FIG. 11 is a schematic diagram of a chassis and a carrier module according to an embodiment of the present disclosure. The embodiments are the same as the second embodiment in implementation. A difference lies in that a positioning base 50 in the embodiments has a base 51, so that the positioning base 50 can be disposed across a plane, a carrying surface 52 being above the base 51, and a measurer 60 being disposed above the carrying surface 52 for measuring at least one of a body weight and a body fat when a to-be-measured person stands on the measurer 60. There is a rotation space 54 between the base 51 and the carrying surface 52. A cantilever 53 has a first end 531 and a second end 532. A carrier module 10 may be connected to the cantilever 53 and a central shaft of the positioning base 50 through assembling, stretching, embedding, and tenon clamping. The cantilever 53 rotates in the rotation space 54, the first end 531 rotates around a center point of the base 51, and the second end 532 is connected to a car body 11, so that the cantilever 53 could control rotation of the car body 11 around the to-be-measured person, and the carrier module 10 moves around under the control of the cantilever 53 and does not deviate from a circular path.

In overall application, through the foregoing implementation structure, when the to-be-measured person stands on the positioning base 50, after the first control circuit board 16 (and the second 16a) receives a signal, brackets operating the bracket module 20 sequentially stretch out. A scanning device 40 located on the sleeve 70 moves from a bottom of a slide rail 71 to a top using a slider element 31. Then, the car body 11 of the carrier module 10 rotates around the positioning base 50 (or the to-be-measured person) as a wheel 12 moves, so that the scanning device 40 could scan the to-be-measured person surrounding the to-be-measured person via the car body 11 and through stretching upward of each bracket of the bracket module 20. In addition, the scanning device 40 may sense a height of the to-be-measured person, so that a position of moving upward by the slider element 31 stops at a proper height of the slide rail 71 on the sleeve 70.

In application, the scanning action of the scanning device 40 may be performed when the carrier module 10 surrounds the to-be-measured person when the bracket module 20 rises. Alternatively, after the height of the to-be-measured person is measured, the bracket module 20 continuously and uninterruptedly moves downward in a scanning process, and when the carrier module 10 synchronously circles around, the scanning device 40 performs the scanning action.

During scanning, the bracket module 20 continuously and uninterruptedly moves downward (or moves upward) in a scanning process through stretching, and the carrier module 10 synchronously circles around. In this case, a relative relationship between a rate of movement of the carrier module 10 and a rate of falling (or rising) of the bracket module 20 is important. In implementation, the relative relationship therebetween may be controlled using a state during 3D scanning imaging to achieve a good scanning imaging result. In implementation, the scanning device 40 may apply auto-focusing and auto-zooming to achieve a good scanning imaging result. Also, by use of a distance from a to-be-measured person obtained whenever necessary during scanning, a radius within which the carrier module 10 circles around is synchronously adjusted for different body shapes, so that a good scanning imaging result is obtained.

The present disclosure is characterized in that when a user uses the three-dimensional human body scanning device 100 to scan a human body, the to-be-measured person may implement human body scanning without rotating. The carrier module moves around the to-be-measured person, the bracket moves in a stretchable and storage manner, and the fixed module moves on the slide rail of the sleeve, so that the scanning device on the fixed module may perform 360° scanning on the to-be-measured person at different heights in sections to obtain dimensions of each part of the body of the to-be-measured person. The three-dimensional human body scanning device in the present disclosure is light and easier to carry, occupying extremely little space as a whole regardless of whether to be used or not. Particular assembling and setting are not required in use, and non-professional personnel could quickly learn to use and control the three-dimensional human body scanning device.

The above descriptions are merely specific embodiments of this application, and are not intended to limit this application in any form. Although this application has been disclosed above through the specific embodiments, the embodiments are not intended to limit this application. A person skilled in the art could make some equivalent variations, alterations or modifications to the above-disclosed technical content without departing from the scope of the technical solutions of this application to obtain equivalent embodiments. Any simple alteration, equivalent change or modification made to the above embodiments according to the technical essence of this application without departing from the content of the technical solutions of this application shall fall within the scope of the technical solutions of this application.

What is claimed is:

1. A three-dimensional human body scanning device, comprising:
    a carrier module comprising a power source inside, the carrier module moving around a to-be-measured person;
    a bracket module and a sleeve, the bracket module being installed above the carrier module, the bracket module comprising a plurality of stretchable brackets connected in a storage manner, and the sleeve being installed at an uppermost part of the bracket module and receiving the foregoing bracket inside the sleeve; and
    a fixed module installed outside the sleeve, the fixed module being configured to fix a scanning device, and the fixed module moving up and down in a slide rail of the sleeve through a slider element and driving the scanning device through up-and-down stretch of the bracket module and movement of the slider element to scan a human body;
    wherein the carrier module is a car body having a plurality of wheels, at least one first motor device being disposed in the car body as the power resource inside the carrier module;
    wherein a first control circuit board, a battery electrically connected to the first control circuit board, at least one driver, and at least one sensor are disposed in the car body, the at least one driver controlling the first motor device.

2. The three-dimensional human body scanning device according to claim 1, wherein the sensor is contactless anti-collision sensor and is configured to send a signal to stop movement of the carrier module when it is detected that an obstacle exists on a forward path of the car body.

3. The three-dimensional human body scanning device according to claim 1, wherein a second motor device and a second control circuit board are provided in the sleeve, the second control circuit board in the sleeve controlling the second motor device to drive actions of the bracket module.

4. The three-dimensional human body scanning device according to claim 1, wherein the bracket module comprises a plurality of brackets with pipe diameters of different sizes, the plurality of brackets are sequentially sleeved and folded according to a pipe diameter size.

5. The three-dimensional human body scanning device according to claim 4, wherein the bracket module further comprises a set of stretchable rods, the set of stretchable rods driving the brackets to move in a stretchable manner.

6. The three-dimensional human body scanning device according to claim 5, wherein the power source controls, through a reduction gear set, the set of stretchable rods to rotate to extend or shorten.

7. The three-dimensional human body scanning device according to claim 1, wherein the fixed module comprises at least one of a clamping device and an adsorption device on the slider element to fix the scanning device onto the slider element.

8. The three-dimensional human body scanning device according to claim 1, further comprising a positioning base, a measurer being disposed above the positioning base and being used by the to-be-measured person to measure at least one of a body weight and a body fat.

9. The three-dimensional human body scanning device according to claim 8, wherein a distance sensor is installed on a side of the carrier module and is configured to position the carrier module to surround the positioning base at a specific distance.

10. The three-dimensional human body scanning device according to claim 9, wherein feature points are disposed on the positioning base, so that the distance sensor is configured to detect the feature points and measures a distance between the carrier module and the positioning base.

11. The three-dimensional human body scanning device according to claim 8, wherein the positioning base has a base, so that the positioning base is disposed across a plane, a carrying surface is disposed above the base, the measurer is disposed above the plane and used by the to-be-measured person to measure at least one of the body weight and body fat, there is a rotation space between the base and the carrying surface, and a cantilever is disposed in the rotation space, a cantilever having a first end and a second end, the first end of the cantilever rotating around a center point of the base, and the second end of the cantilever being connected to the carrier module.

* * * * *